United States Patent
Weber et al.

(10) Patent No.: US 8,287,414 B2
(45) Date of Patent: Oct. 16, 2012

(54) TRANSMISSION DEVICE HAVING A VARIATOR

(75) Inventors: Tobias Weber, Radolfzell (DE); Gerhard Bailly, Friedrichshafen (DE); Thomas Ratzmann, Meckenbeuren (DE); Walter Fischer, Friedrichshafen (DE); Jurgen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 273 days.

(21) Appl. No.: 12/679,512

(22) PCT Filed: Aug. 15, 2008

(86) PCT No.: PCT/EP2008/060757
§ 371 (c)(1),
(2), (4) Date: Mar. 23, 2010

(87) PCT Pub. No.: WO2009/047035
PCT Pub. Date: Apr. 16, 2009

(65) Prior Publication Data
US 2010/0197439 A1  Aug. 5, 2010

(30) Foreign Application Priority Data

Oct. 2, 2007 (DE) .......................... 10 2007 047 194
Jul. 16, 2008 (DE) .......................... 10 2008 040 441

(51) Int. Cl.
*F16H 37/08* (2006.01)
*F16H 47/04* (2006.01)

(52) U.S. Cl. ............................ 475/72; 475/210; 475/302

(58) Field of Classification Search .................. 475/207, 475/208, 216, 218, 83, 81, 72, 210, 211, 475/302; 74/730.1, 731.1, 732.1, 733.1
See application file for complete search history.

(56) References Cited

U.S. PATENT DOCUMENTS

| | | | |
|---|---|---|---|
| 2,583,656 A | 1/1952 | Lay | |
| 2,808,737 A | 10/1957 | Bullard, III | |
| 3,023,638 A | 3/1962 | Westbury et al. | |
| 3,204,486 A | 9/1965 | Lalio | |
| 3,212,358 A | 10/1965 | Lalio | |
| 3,580,107 A | 5/1971 | Orshansky, Jr. | |
| 3,601,981 A | 8/1971 | Ifield | |
| 3,626,787 A | 12/1971 | Singer | |
| 3,714,845 A | 2/1973 | Mooney, Jr. | |

(Continued)

FOREIGN PATENT DOCUMENTS

AT   197 650 B   10/1957

(Continued)

*Primary Examiner* — Justin Holmes
*Assistant Examiner* — Lillian Nguyen
(74) *Attorney, Agent, or Firm* — Davis & Bujold, P.L.L.C.

(57) ABSTRACT

A continuously variable transmission device comprising a variator and a secondary power splitting. For power splitting, a planetary gear set has a first shaft coupled to the transmission input, a second shaft of the gear set coupled a first shaft of the variator, and a third shaft of the gear set couples a second shaft of the variator. First and second shift elements are provided to switch between first and second gear ratio ranges. Via the variator, the gear ratio is continuously variable within the gear ratio range and the two gear ratio ranges overlap. To implement the first gear ratio range, the second shaft of the gear set is connected, via the first shift element, to the transmission output, and to implement the second gear ratio range, the third shaft of the planetary gear set is connected, via the second shift element, to the transmission output.

20 Claims, 5 Drawing Sheets

U.S. PATENT DOCUMENTS

| | | |
|---|---|---|
| 3,834,164 A | 9/1974 | Ritter |
| 4,019,404 A | 4/1977 | Schauer |
| 4,121,479 A | 10/1978 | Schauer |
| 4,434,681 A | 3/1984 | Friedrich et al. |
| 4,446,756 A | 5/1984 | Hagin et al. |
| 4,563,914 A | 1/1986 | Miller |
| 4,776,233 A | 10/1988 | Kita et al. |
| 4,813,306 A | 3/1989 | Kita et al. |
| 4,976,664 A | 12/1990 | Hagin et al. |
| 5,071,391 A | 12/1991 | Kita |
| 5,421,790 A | 6/1995 | Lasoen |
| 5,643,122 A | 7/1997 | Fredriksen |
| 5,643,131 A * | 7/1997 | Kuhn et al. .................. 475/210 |
| 5,667,452 A | 9/1997 | Coutant |
| 5,766,107 A | 6/1998 | Englisch |
| 5,868,640 A | 2/1999 | Coutant |
| 5,890,981 A | 4/1999 | Coutant et al. |
| 6,029,542 A | 2/2000 | Wontner |
| 6,056,661 A | 5/2000 | Schmidt |
| 6,485,387 B1 | 11/2002 | Goodnight et al. |
| 6,592,485 B2 | 7/2003 | Otten et al. |
| 6,761,658 B1 | 7/2004 | Stettler, Jr. |
| 7,097,583 B2 | 8/2006 | Lauinger et al. |
| 7,354,368 B2 | 4/2008 | Pollman |
| 7,448,976 B2 | 11/2008 | Hiraki et al. |
| 2002/0042319 A1 | 4/2002 | Otten et al. |
| 2003/0089107 A1 | 5/2003 | Tani |
| 2003/0150662 A1 | 8/2003 | Tani |
| 2003/0166430 A1 | 9/2003 | Folsom et al. |
| 2004/0242357 A1 | 12/2004 | Ishizaki |
| 2006/0094554 A1 | 5/2006 | Schmidt |
| 2006/0276291 A1 | 12/2006 | Fabry et al. |
| 2007/0277520 A1 | 12/2007 | Gollner |
| 2007/0281815 A1* | 12/2007 | Gollner ........................ 475/72 |
| 2008/0085801 A1 | 4/2008 | Sedoni et al. |
| 2008/0103006 A1 | 5/2008 | Pollman et al. |
| 2008/0214349 A1* | 9/2008 | Liebherr et al. ............... 475/81 |
| 2008/0214351 A1 | 9/2008 | Katayama et al. |
| 2009/0270212 A1 | 10/2009 | Ueda et al. |
| 2010/0056318 A1 | 3/2010 | Glockler |
| 2010/0204000 A1* | 8/2010 | Bailly et al. .................. 475/248 |

FOREIGN PATENT DOCUMENTS

| | | |
|---|---|---|
| DE | 1 069 978 | 11/1959 |
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1 197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

TRANSMISSION DEVICE HAVING A VARIATOR

This application is a National Stage completion of PCT/EP2008/060757 filed Aug. 15, 2008, which claims priority from German patent application serial no. 10 2007 047 194.9 filed Oct. 2, 2007 and German patent application serial no. 10 2008 040 444.1 filed Jul. 16, 2008.

FIELD OF THE INVENTION

The invention relates to a transmission device having at least one variator for the continuous variation of transmission and having secondary power splitting.

BACKGROUND OF THE INVENTION

From DE 10 2006 025 348 A1 a power-split transmission having a variator designed as hydrostatic device is known. The power-split transmission is equipped with a power splitting planetary gear set, wherein a shaft of the planetary gear set is operatively connected to a first shaft of the variator, and in this manner an adjustable pump can be driven. An additional shaft of the planetary gear set is connected via a gear wheel to a second shaft of the variator, which, in turn, is operatively connected to a hydraulic motor of the variator. The third shaft of the planetary gear set is connected to a transmission input of the power-split transmission which is connected to a drive device.

In addition, the second shaft of the variator is designed with a plurality of fixed gears which mesh with a plurality of idler gears arranged on a countershaft, wherein the idler gears can be connected rigidly to the countershaft via shift elements to implement different driving modes and/or transmission ratios for forward driving and at least one driving mode for reverse driving.

Disadvantageously, the alternation between the driving modes cannot be carried out in a synchronous manner, so that to avoid an interruption in torque flow, in any case during a change in driving mode, power shifting with simultaneous correction of transmission ratio must be carried out in the region of the hydrostatic device. During such shifts, under certain circumstances disturbing reactive torques in the drive train of a work machine occur, which negatively impact a sequence of operation of a work machine equipped with the above-described power-split transmission and are perceived by an operator as a jerk in the working machine.

SUMMARY OF THE INVENTION

Therefore the problem of the present invention is to provide a transmission device by which, in critical operating states of a work machine, synchronous shifts in driving modes can be carried out and which has a simple design.

The transmission device according to the invention is designed with at least one variator for the continuous variation of transmission and with secondary power splitting, wherein a planetary gear set is provided for power splitting. A first shaft of the planetary gear set is coupled to the transmission input, a second shaft of the planetary gear set is coupled to a first shaft of the variator, and a third shaft of the planetary gear set is coupled to a second shaft of the variator. In addition, at least one first shift element and a second shift element are provided for shifting between a first gear ratio range and a second gear ratio range, within which the gear ratio can be continuously varied by the variator.

According to the invention, the two gear ratio ranges overlap, and in order to implement the first gear ratio range, the second shaft of the planetary gear set can be connected to the transmission output via the first shift element, and to implement the second gear ratio range, the third shaft of the planetary gear set can be connected to the transmission output via the second shift element.

In the transmission device according to the invention, by means of suitable actuation of the variator between the second shaft and the third shaft of the planetary gear set, the gear ratio of +1 can be implemented, so that the variator rotates in the block and a shift between the first shift element and the second shift element can be carried out without rotational speed differences. This means that the shift between the first driving mode and the second driving mode is synchronous in the transmission device and can be implemented without impairing the sequence of operation of a work machine equipped with the transmission device according to the invention.

Moreover, starting a work machine from a stopped position is possible with split power, whereby a load on the variator is reduced in a simple manner in comparison to prior art transmission devices in which a starting torque is routed entirely via the variator while starting the work machine.

In addition, the transmission device according to the invention, which is configured with a single, simple planetary gear set and a variator, has a simple design and also a small number of components, so that the transmission device can be assembled with little expense, is low in cost to manufacture and is distinguished by a small required installation space.

Another advantageous refinement of the transmission device is distinguished by a compact design and equipped with a countershaft arranged parallel to the second shaft of the variator and operatively connected to the transmission output.

In an additional embodiment of the transmission device according to the invention distinguished by a small number of components, at least one idler gear can be connected rigidly to the second shaft of the variator via the two shift elements and to the third shaft of the planetary gear set, the idler gear in turn being operatively connected to a gear wheel of the countershaft.

In another embodiment of the transmission device according to the invention which is characterized by a simple design and has a compact design, the two shift elements are arranged on the third shaft of the planetary gear set or on the second shaft of the variator.

In order to reduce the load on the variator in a simple and low-cost manner with regard to the design, and be able to increase the power which can be transmitted via the transmission device according to the invention, compared to the power which can be supplied by transmission devices of conventional design, the second shaft of the planetary gear set—in one embodiment of the transmission device—is operatively connected to the first shaft of the variator via a transmission unit, so that a high gear ratio can be implemented between the first shaft of the variator and the second shaft of the planetary gear set.

In an additional embodiment of the transmission device according to the invention, a reversal of the direction of rotation between the transmission input and the transmission output can be implemented by means of a valve device of a hydraulic circuit of the variator designed as a hydrostatic device, so that the direction of pumping can be switched in the hydraulic circuit.

In order to implement additional gear ratio ranges, in another embodiment of the transmission device according to the invention, between the third shaft of the planetary gear set and the transmission output, a plurality of gear wheel pairs are provided, which can be connected via additional shift elements, wherein according to a refinement of the transmission device, at least one of the gear wheel pairs is designed with an intermediate gear in order to implement a reversal of the direction of rotation between the transmission input and the transmission output.

An additional, advantageous embodiment of the transmission device according to the invention is equipped with a third shift element, via which the second shaft of the planetary gear set can be coupled to the transmission output in order to implement a third gear ratio range, which overlaps with the second gear ratio range. In this way, both the change in range between the first and the second gear ratio ranges, and also the change in range between the second gear ratio range and the third gear ratio range of the transmission device according to the invention, are synchronous, that is, they can be carried out without differences of rotational speed in the range of the first shift element and of the second shift element and/or between the second shift element and the third shift element, using a planetary gear set having only two outputs, which can be produced cost-effectively and has a simple design.

Therefore, in a very simple manner, depending on the particular application at hand, the possibility exists to achieve a so-called modular principle and to design the transmission device according to the invention solely with the first and the second shift elements in order to implement a synchronous range change, and to configure the transmission device additionally with the third shift element in order to implement two synchronous range changes, without having to change the fundamental structure of the transmission device.

This means that the transmission device according to the invention is configured with or without the third shift element, depending on whether the transmission device is intended to be used to perform one or two synchronous range changes, wherein the particular design, in the case of especially low-cost solutions, can be achieved without complex design changes to the fundamental structure of the transmission device.

In order to be able to execute a required change between the gear ratio ranges in the transmission device according to the invention as a power shift, the shift elements in another advantageous embodiment of the transmission device are designed as frictionally engaging power shift elements.

BRIEF DESCRIPTION OF THE DRAWINGS

Additional advantages and advantageous embodiments of the invention will be apparent from the claims and in the embodiments described in principle with reference to the FIGS., wherein for conciseness in the description of the embodiments, the same reference numbers are used identical and functionally equivalent components.

Shown are.

DETAILED DESCRIPTION OF THE PREFERRED EMBODIMENTS

Figure 1:
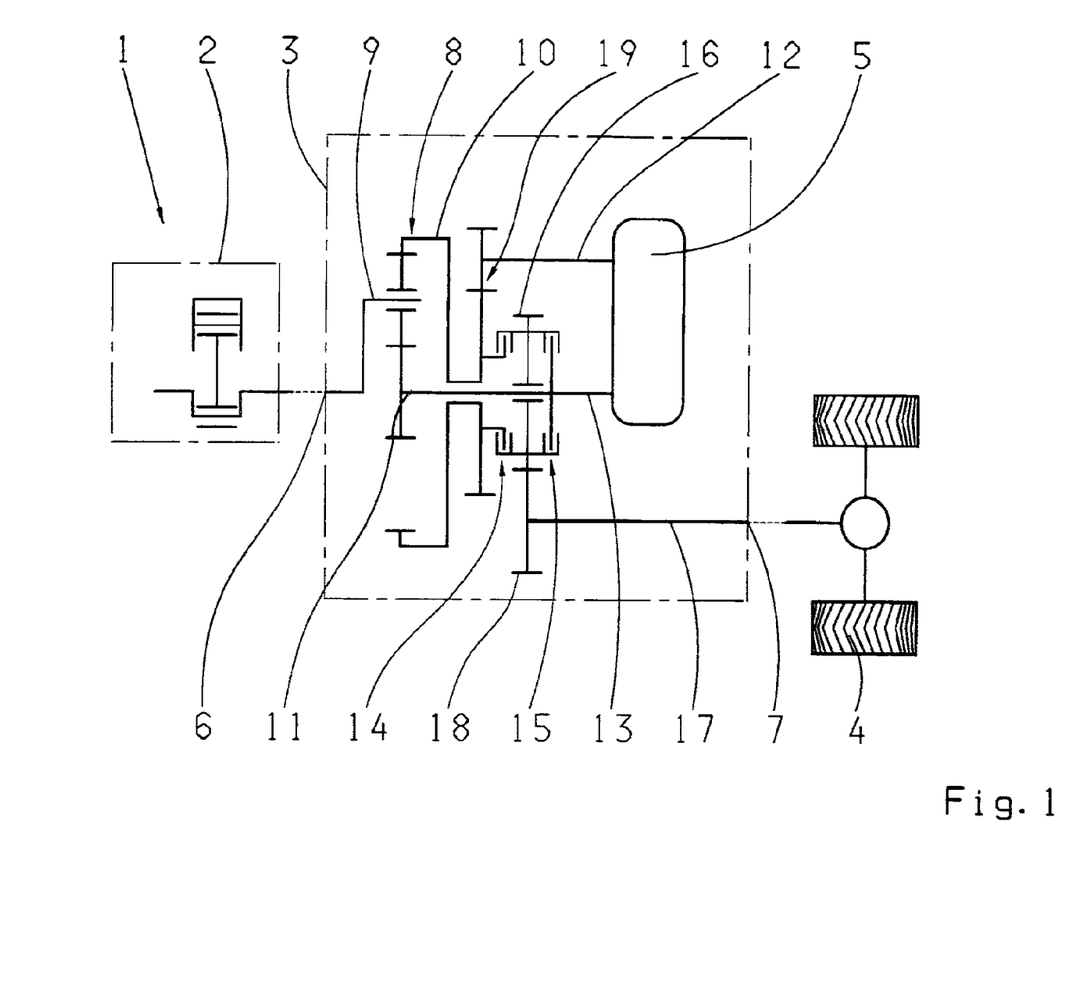
FIG. 1 A schematic representation of a vehicle drive train with a gear diagram of a first embodiment of the transmission device according to the invention.

FIG. 1 shows a vehicle drive train 1 comprising a drive motor 2, a transmission device 3 and an output 4 in a highly schematic representation. The transmission 3 is equipped with a variator 5 designed as a hydrostatic device for the continuous variation of gear ratios of the transmission device 3. Torque provided by the drive machine 2 is introduced to the transmission device 3 in the region of a transmission input 6 and conducted out of the transmission device 3 in the direction of the drive 4 in the region of a transmission output 7.

On the transmission input side, the torque applied in the region of the transmission input 6 is introduced into a planetary gear set 8 via a first shaft 9 designed herein as planet carrier. In the region of the planetary gear set 8 so-called power splitting of the torque from the drive motor 2 is performed, wherein a portion of the torque is divided by a second shaft 10, designed herein as a ring gear, of the planetary gear set 8 and a third shaft 11, designed as sun gear, of the planetary gear set 8. The second shaft 10 of the planetary gear set 8 is coupled to a first shaft 12 of the variator 5 and the third shaft 11 of the planetary gear set 8 is coupled to a second shaft 13 of the variator 5.

For shifting between a first gear ratio range and a second gear ratio range, the transmission device 3 is designed with two shift elements 14, 15. Within the two gear ratio ranges, the gear ratio of the transmission device 3 can be continuously varied by the variator 5, wherein the ring gear 10 of the planetary gear set 8 can be connected, via the first shift element 14, to a idler gear 16 arranged in a rotatable manner on the second shaft 13 of the variator 5. The third shaft and/or the sun gear of the planetary gear set 8 can be connected rigidly to the idler gear 16 via the second shift element 15. The idler gear 16 meshes with a gearwheel 18 connected rigidly to a countershaft 17, which in turn is operatively connected to the transmission output 7.

Between the ring gear 10 of the planetary gear set 8 and the first shaft 12 of the variator 5, a transmission device 19 designed herein as spur gear toothing is provided, by means of which the torque conducted from the ring gear 10 of the planetary gear set 8 to the variator 5 is reduced and the rotational speed of the first shaft 12 of the variator 5 is increased in comparison to the rotational speed of the ring gear 10.

The two gear ratio ranges which can be engaged in the transmission device 3 via the shift elements 14 and 15 overlap. In order to implement the first gear ratio range, the second shaft 10 of the planetary gear set 8 is connected via the first shift element 14 to the transmission output 7, and in order to implement the second gear ratio range, the third shaft 11 of the planetary gear set 8 is connected via the second shift element 15 to the transmission output 7, wherein during the change between the gear ratio ranges, the gear ratio in the region of the variator 5 is set to a value at which the ring gear 10 and the sun gear 11 of the planetary gear set 8 rotate at the same rotational speed.

At this synchronous point of the transmission device 3, the shift element 14 or 15 which is connected is moved from the engaged operating state thereof into the disengaged operating state thereof, while the respectively disconnected shift element 15 or 14 is moved from the disengaged operating state thereof into the engaged operating state thereof, wherein during the switch between the two shift elements 14 and 15 no rotational speed difference must be overcome.

The variator 5 and/or the hydrostatic unit is equipped with a pump and a motor in a bent-axis design, which are forcecoupled via a common pivot unit, and thus has a simple and cost-effective control using only one adjusting mechanism. Depending on an actuation angle of the common pivot part between the motor and the pump of the variator 5, which can pivot between 0° to about 45°, the rotational speeds of the first shaft 12 and of the second shaft 13 of the variator 5 alternate in the end positions of the pivot part between shaft stoppage and maximum rotational speed.

Depending on the particular application at hand, however, it is also possible to design the variator with units which can be set independently of each other.

In principle, the directions of rotation of the shafts 12 and 13 of the variator 5 are such that while the vehicle equipped with the vehicle drive train 1 drives forward and the pivot part of the variator 5 pivots in the region of the two shift elements 14 and 15, the synchronous operation necessary for the synchronous change in gear ratio can be set, wherein the directions of rotation of the two shafts 12 and 13 of the variator 5 are in principle opposite of each other.

The transmission device 3 is equipped with a single, simple planetary gear and a variator 5, which is arranged in the manner described above between two shafts 10 and 11 of the planetary gear set 8, in order to be able to implement the largest possible, continuous driving mode during a synchronous switch between the two shift elements 14 and 15. Moreover, starting from a vehicle standstill can be carried out in a power-split manner when using the transmission device 3.

With the vehicle stopped, the pivot part of the variator 5 is pivoted such that the first shaft 12 of the variator 5 is locked by variator-internal states, and the second shaft 13 of the variator 5 can freely rotate without power transmission, wherein the countershaft 17 and also the transmission output 7 are locked when the first shift element 14 is engaged and are fixed like the output 4.

If the pivot part of the variator 5 is pivoted out of the above-mentioned position, the first shaft of the variator 12 begins to rotate and the second shaft 13 of the variator 5 begins to take up power. In the region of the first shift element 14, the torque applied via the ring gear 10 of the planetary gear set 8, which is now supported in the region of the variator 5, is transferred, via the idler gear 16 and the gearwheel 18, to the countershaft 17 and thus to the transmission output 7, whereby the output 4 and/or the vehicle equipped with the vehicle drive train 1 begins to roll. The first shift element 14 remains engaged in the entire first gear ratio range and/or driving mode of the transmission device 3.

Proceeding from the operating state of the transmission device 3 last-described above, an increasing adjustment angle of the pivot part of the variator 5 during the vehicle's starting process causes a gear ratio having a value of +1 to be set in the region of the planetary gear set 8 between the sun gear 11 and the ring gear 10 at a predefined operating point of the variator 5. The ring gear 10 and the sun gear 11 then have the same rotational speed and the planetary gear set 8 revolves in the block. In this operating state of the transmission device 3, a switch can be carried out between the two shift elements 14 and 15 without rotational speed difference.

In order for the adjusting range of the variator 5 in the first gear ratio range and in the second gear ratio range to be used repeatedly and for the power transmittable via the transmission device 3 to be increased using a simple design, the transmission device 10 is arranged between the first shaft 10 of the planetary gear set 8 and/or the ring gear and the first shaft 12 of the variator. By means of the transmission device 10, a high gear ratio can be implemented between the first shaft 12 of the variator 5 and the ring gear 10 of the planetary gear set 8, whereby due to the arrangement of the transmission device 19, the synchronous point in the region of the two shift elements 14 and 15 is reached not until an adjusting angle of the pivot part is clearly greater than half the total pivot angle.

After switching from the first shift element 14 in the direction of the second shift element 15, the pivot angle of the variator 5 is reduced in order to increase the rotational speed of the output drive shaft and/or the rotational speed of the countershaft 17. The greatest rotational speed of the countershaft 17 and/or of the transmission output 7 is reached when—with the second shift element 15 engaged—ring gear 10 of the planetary gear set 8 is blocked by the variator 5. In this operating state of the transmission device 3, the sun gear 11 of the planetary gear set 8 is driven without power transmission in the region of the variator 5, since the entire torque of the drive motor 2 is conducted, via the second shift element 15, to the output 4.

In order also to be able to provide a gear ratio range for reverse driving with the transmission device 3 without additional mechanical components, the transmission device 3 can be designed with a device (not illustrated in detail) which can switch the hydraulic pumping direction in the region of the variator 5 when the vehicle is stopped. It is conceivable that the hydraulic circuit of the variator 5 can be equipped with a valve device known from DE 10 2006 025 348 A1.

Figure 2:
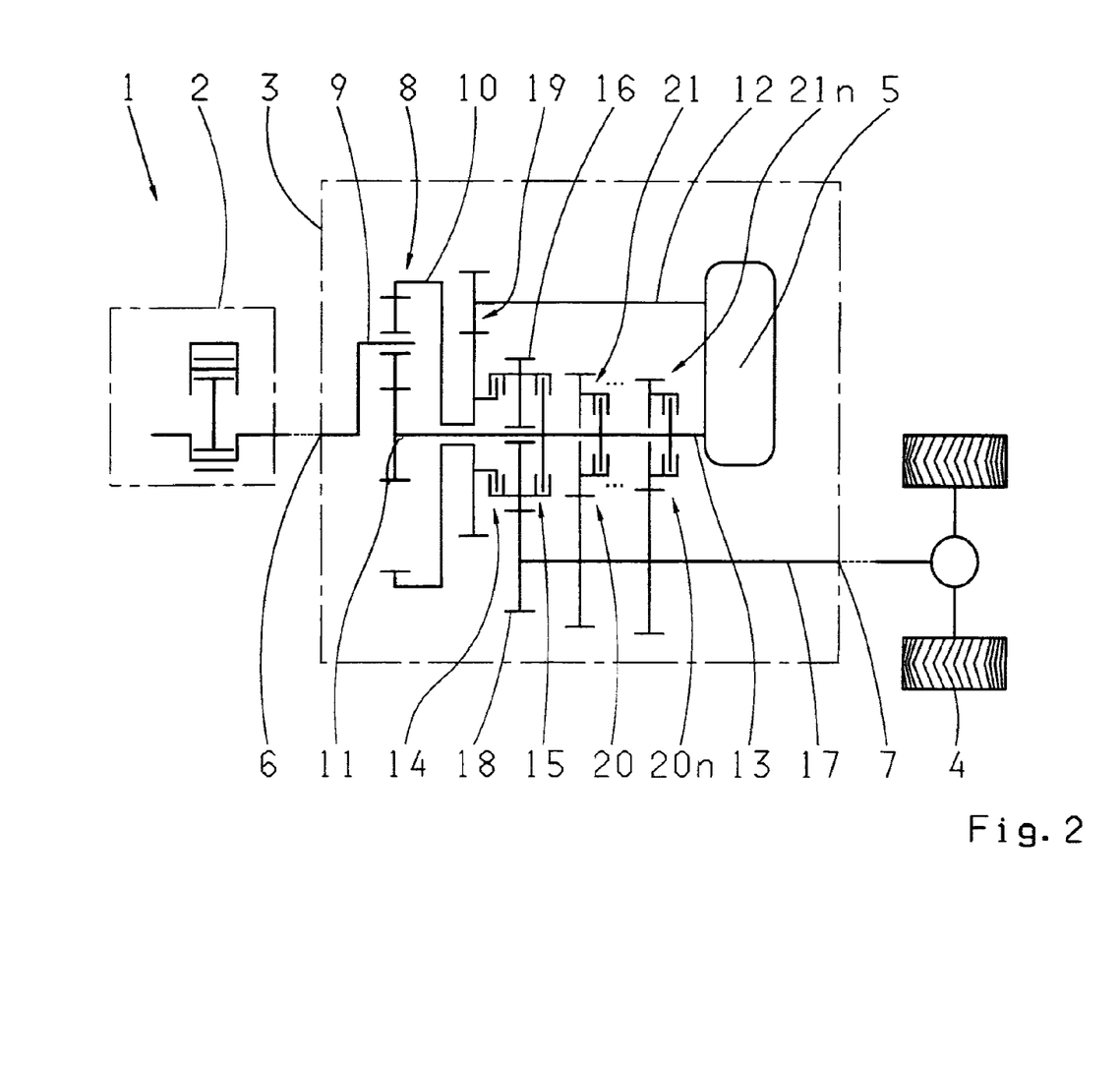
FIG. 2 A vehicle drive train with a second embodiment of the transmission device according to the invention.

FIG. 2 shows a second embodiment of the transmission device 3 which differs from the embodiment illustrated in FIG. 1 in the region between the sun gear 11 of the planetary gear set 8 and the transmission output 7 due to additional gear sets 20 to 20n as well as shift elements 21 to 21n associated therewith, in order to make available additional gear ratio ranges which can be engaged by power shift processes in the transmission device 3. The letter n added after the particular reference numbers 20 and 21 in each case denote the particular integral quantity of additional gearwheel pairs and shift elements of the transmission device 3, which varies as a function of the particular application at hand. The transmission device 3 must be designed with additional gear ratio ranges if a vehicle designed with the vehicle drive train 1 is to be operated at higher final speeds.

In principle, a change in gear ratio in the transmission device 3 between the first shift element 14 or the second shift element 15 and the third shift element 21 and/or the additional shift elements 21n can only be carried out in a non-synchronous operating state of the transmission device 3. Nonetheless, during changes between the first gear ratio range or the second gear ratio range and the third or the n-th gear ratio range, the possibility exists to reduce the rotational speed difference to be bridged during the shift process by adapting the gear ratio of the variator 5.

Figure 3:
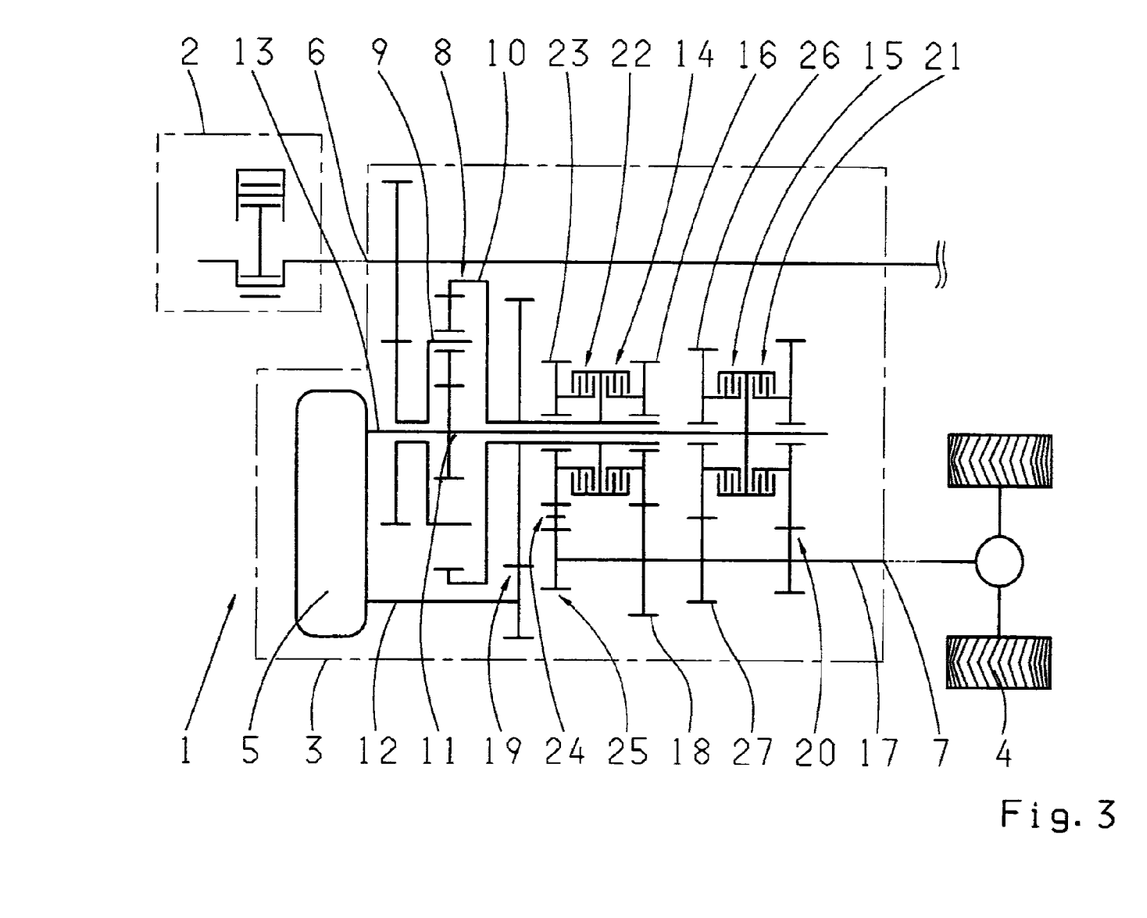
FIG. 3 A vehicle drive train with a third embodiment of the transmission device according to the invention.

In the third embodiment of the transmission device 3 illustrated in FIG. 3, the ring gear 10 of the planetary gear set 8, in addition to the first shift element 14 and the idler gear 16 and the gear wheel 18, can be operatively connected to the countershaft 17 via an additional shift element 22. To this end, an idler gear 23 rotatably arranged on the sun gear 11 of the planetary gear set 8 can be connected rigidly to the ring gear 10 of the planetary gear set 9 via the additional shift element 22. The idler gear 23 meshes with an intermediate gear 24 which, in turn, engages with a fixed gear 25 of the countershaft 17.

Therefore, a gear set including the intermediate gear 24 can be connected via the additional shift element 22 between the ring gear 10 of the planetary gear set 8 and the transmission output 7 in power flow of the transmission device 3. The shift between the first shift element 14, the second shift element 15 or the additional shift element 21 and the additional shift element 22 in each case is carried out at low rotational speeds of the output 4 or with the output 4 stopped. The shifts each represent reverse shifts by which reverse driving of a vehicle equipped with the vehicle drive train 1 according to FIG. 3 is possible.

In contrast to the embodiments of the transmission device 3 as per FIG. 1 and FIG. 2, an idler gear 26 can be connected rigidly, via the second shift element 15, to the sun gear 11 of the planetary gear set 8, the idler gear meshing with an additional fixed gear 27 of the countershaft and not forming an integral unit with the idler gear 16. The change in the gear ratio range during which a switch occurs between the first shift element 14 and the second shift element 15, can be implemented synchronously through a corresponding actuation of the variator 5, that is, without rotational speed difference in the region of the shift elements 14 and 15.

Figure 4:
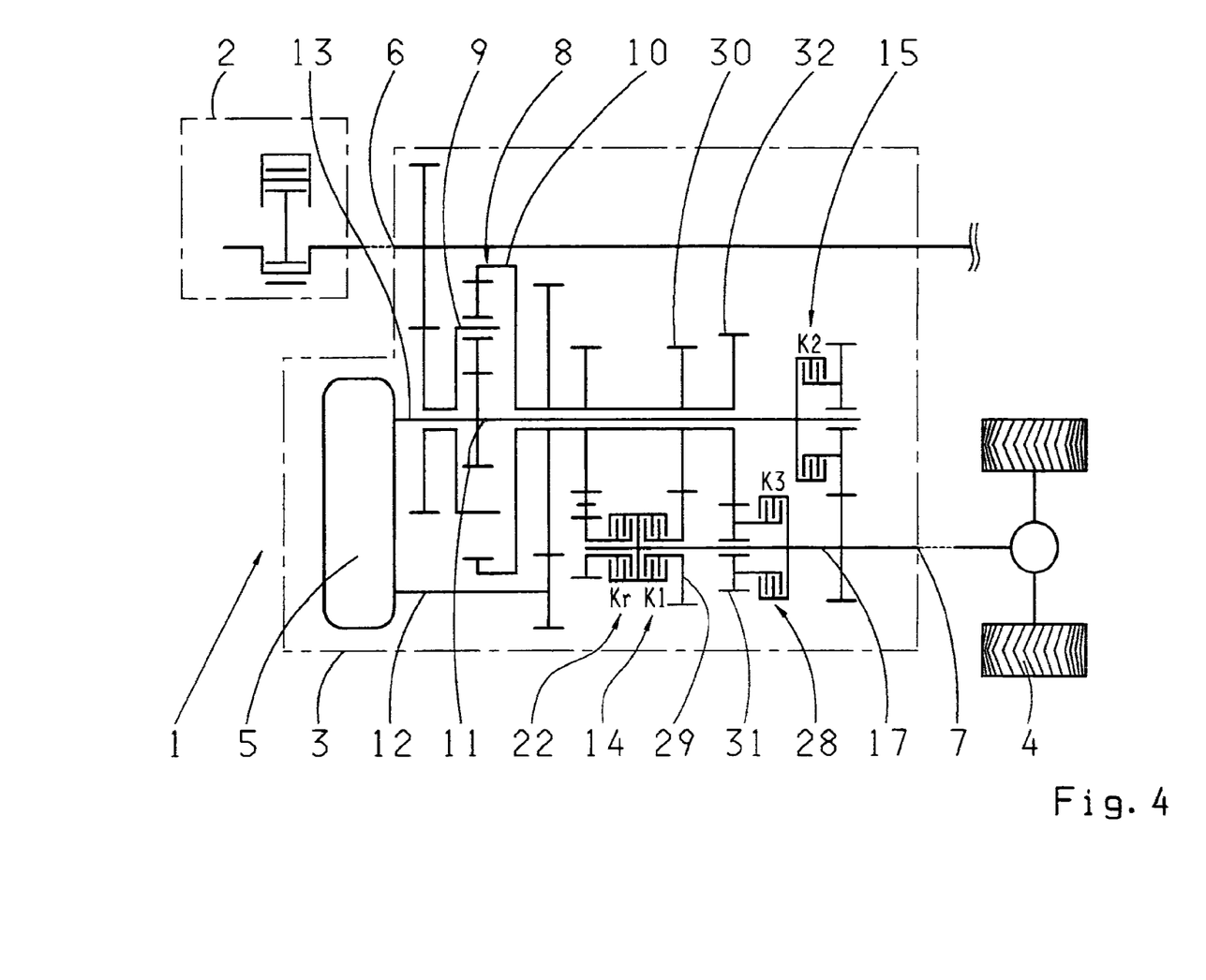
FIG. 4 A vehicle drive train with a fourth embodiment of the transmission device according to the invention.
Figure 5:
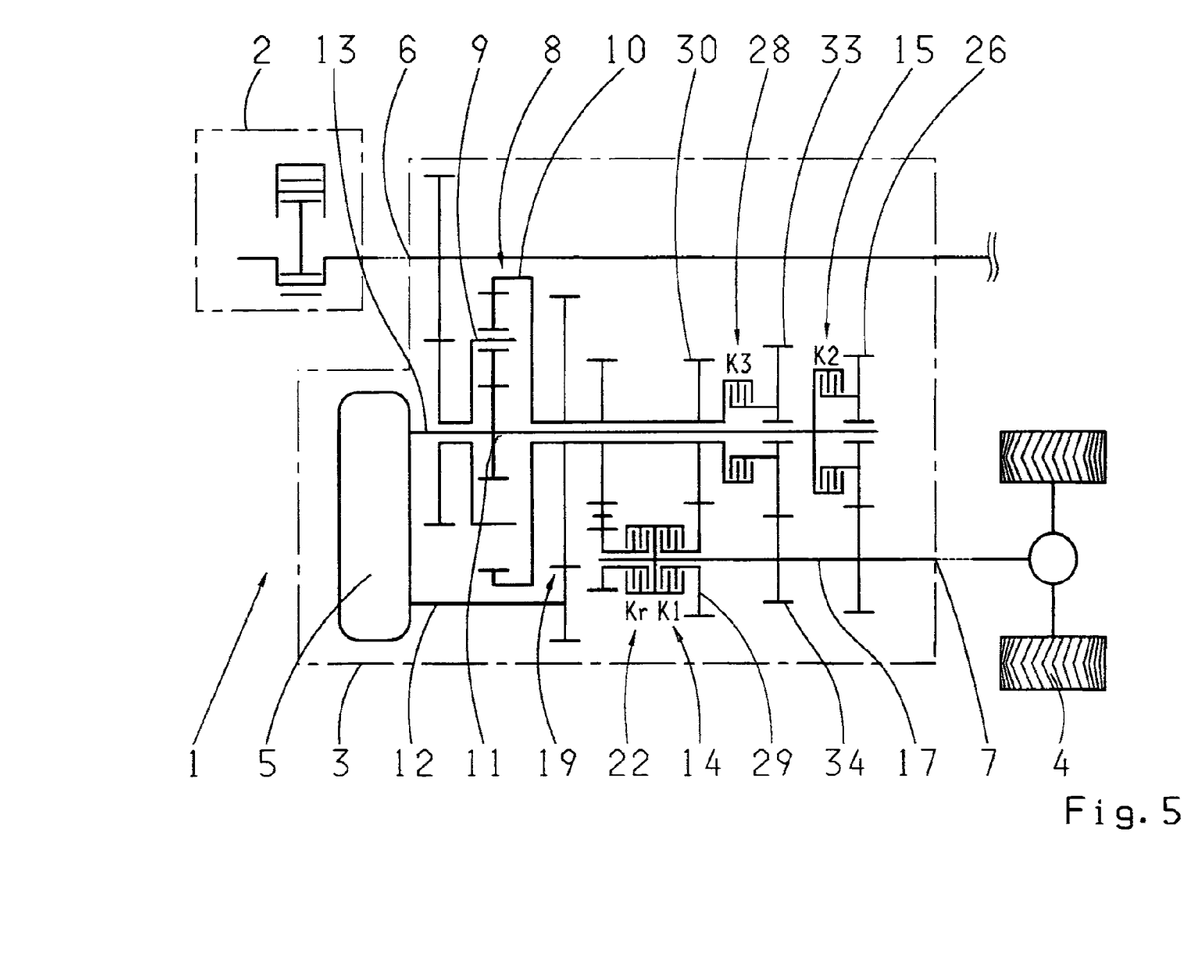
FIG. 5 A vehicle drive train with a fifth embodiment of the transmission device according to the invention.

FIG. 4 and FIG. 5 show a fourth and fifth embodiment, respectively, of the transmission device 3, which have basically the same design and which differ from the embodiments of the transmission device 3 illustrated in FIG. 1 to FIG. 3 in that two synchronous range changes can be carried out with the transmission devices 3 as per FIG. 4 and FIG. 5.

The transmission devices 3 according to FIG. 4 and FIG. 5 are therefore designed with the two shift elements 14 and 15 and also with a third shift element 28. In order to implement the first gear ratio range of the transmission device 3, the second shaft and/or the ring gear 10 of the planetary gear set 8 are connected in the engaged state of the first shift element 14 to the transmission output 7, wherein an idler gear 29, which is rotatably arranged on the countershaft 17 and which meshes with a fixed gear 30 rigidly operatively connected to the ring gear 10, is rigidly connected to the countershaft 17 in the engaged state of the first shift element 14.

Proceeding from an operating state of the vehicle drive train 1, for which the first gear ratio range is engaged in the transmission device 3 via the engaged first shift element 14, and with the vehicle being stopped, the variator 5 is adjusted to the first extreme position thereof, in which the rotational speed of the first shaft 12 of the variator 5, which is connected to a motor device of the variator 5, is equal to zero. The ring gear 10 connected to the first shaft 12 of the variator 5 via the transmission device 19 is likewise stopped in this operating state. If an appropriate command is present for a starting process of the vehicle designed with the vehicle drive train 1, then the variator 5 is pivoted out of the aforementioned, first extreme position via a preferably common yoke and the rotational speed and/or the motor rotational speed of the variator's motor increases. This at the same time means that the rotational speed of the output 4 of the vehicle designed with the transmission device 3 increases and the vehicle starts to move.

In order to continuously increase the vehicle's speed, the variator 5 is adjusted from the first extreme position thereof into the second extreme position thereof, and the first gear ratio range of the transmission device 3 is driven continuously. In the process, the rotational speed of the motor of the variator 5 rises increasingly in the direction of the maximum value thereof, while the rotational speed of the variator's pump decreases from the maximum value thereof to zero. In the second extreme position of the variator 5, in the region of the second shift element 15, the synchronous point materializes, whereby the second shift element 15 can be transferred into the engaged operating state thereof without rotational speed difference, while the first shift element 14 is disengaged.

After a successful synchronous range change from the first gear ratio range into the second gear ratio range and in the presence of an additional command to increase the vehicle speed, the variator 5, starting from the second extreme position thereof, is again pivoted in the direction of the first extreme position thereof. This causes the rotational speed of the second shaft of the variator 13 to increase, while the rotational speed of the ring gear 10 is reduced.

At a predefined pivot angle of the yoke of the variator 5, which depends on the gear ratio of the spur gear toothing formed by the idler gear 29 and the fixed gear 30, the synchronous point is reached simultaneously in the region of the second shift element 15 and in the region of the third shift element 28, whereby a second synchronous range change can be carried out between the second gear ratio range and the third gear ratio range in the transmission device 3 without rotational speed difference between the second shift element 15 and the third shift element 28.

In the fourth embodiment of the transmission device 3 illustrated in FIG. 4, the third shift element 28 is arranged on the countershaft 7 and rigidly couples an idler gear 31, which is arranged on the countershaft 7 and meshes with a fixed gear 32 rigidly connected to the ring gear 10, to the countershaft 7 in the engaged state of the shift element.

In the fifth embodiment of the transmission device 3 illustrated in FIG. 5, the third shift element 28 is arranged on the second shaft 13 of the variator 5 and connects an idler gear 33 rotatably arranged on the second shaft 13 of the variator 5 to the ring gear 10 of the planetary gear set 8 in the engaged state of the shift element. The idler gear 33 meshes with a fixed gear 34 rigidly connected to the countershaft 17, whereby an operative connection is created between the ring gear 10 and the transmission output 7 in the engaged state of the third shift element 28.

Both with the transmission device 3 according to FIG. 4, and also with the transmission device 3 according to FIG. 5, two synchruons range changes can be implemented using a planetary gear set having only two output shafts which is cost-effective to produce and has a simple design.

In principle, the fourth and the fifth embodiments of the transmission device 3 each represent an expanded system in comparison to the embodiments of the transmission device 3 illustrated in FIG. 1 to FIG. 3, wherein depending on the particular application at hand one or two synchronous range changes can be carried out if the transmission device 3 has the necessary design for this.

In this connection, in order to achieve a modular principle the transmission device 3 ideally must be designed such that, depending on the demand for a two- or three-speed transmission having one or two synchronous range changes, the third shift element 28 is provided or the transmission device 3 is designed without the third shift element 28.

The shift elements 14, 15, 21 to 21$n$, 22 and 28 of the embodiments of the transmission device 3 illustrated in the drawing are all designed as frictionally engaged multi-disk clutches and/or frictionally engaged shift elements, in order to be able to implement the change between the gear ratios ranges to be carried out in the transmission device 3 without interruption in the torque flow.

In contrast to the embodiments illustrated in the drawing and explained in greater detail in the description above, the transmission device according to the invention can also be designed with different variators by which the transmission of power from the drive machine 2 in the direction of the output 4 can be continuously transmitted and varied. This means that the transmission device 3 according to the invention can also be designed with other suitable embodiments of a variator, such as a variable speed gear, a friction wheel-type variator, two mutually operatively connected electric motors and the like, wherein in the realm of agricultural machines, the design of a variator as hydrostatic device is preferred, since this variant has the greater power density.

LIST OF REFERENCE NUMERALS

1 Vehicle drive train
2 Drive motor
3 Transmission device
4 Output
5 Variator
6 Transmission input
7 Transmission output
8 Planetary gear set
9 First shaft of planetary gear set
10 Second shaft of planetary gear set
11 Third shaft of planetary gear set
12 First shaft of variator
13 Second shaft of variator
14 First shift element
15 Second shift element
16 Idler gear
17 Countershaft
18 Gear wheel
19 Transmission unit
20 to 20n Gear wheel pairs
21 to 21n Shift elements
22 Additional shift element
23 Idler gear
24 Intermediate gear
25 Gear wheel
26 Idler gear
27 Fixed gear
28 Third shift element
29 Idler gear
30 Fixed gear
31 Idler gear
32 Fixed gear
33 Idler gear

The invention claimed is:

1. A transmission device (3) having at least one variator (5) for the continuous variation of a gear ratio and having secondary power splitting;
   a planetary gear set (8) being provided for power splitting;
   a first shaft (9) of the planetary gear set (8) being coupled to a transmission input (6);
   a second shaft (10) of the planetary gear set (8) being coupled to a first shaft (12) of the variator (5);
   a third shaft (11) of the planetary gear set (8) being coupled to a second shaft (13) of the variator (5);
   at least one of a first shift element (14) and a second shift element (15) being provided for switching between a first gear ratio range and a second gear ratio range, within which the gear ratio is continuously varied by the variator (5), and the first and the second gear ratio ranges at least partially overlap one another;
   the second shaft (10) of the planetary gear set (8) being connected, via the first shift element (14), to a transmission output (7) in order to implement the first gear ratio range;
   the third shaft (11) of the planetary gear set (8) being directly connected to the second shift element (15), and being connectable, via the second shift element (15), to the transmission output (7) in order to implement the second gear ratio range;
   at least one idler gear (16) being rigidly connectable, via one of the first and the second shift elements (14, 15), to one of the second shaft (13) of the variator (5) and the third shaft (11) of the planetary gear set (8); and
   the second shaft (10) of the planetary gear set (8) being one of directly connected to the first shift element (14), and directly coupled to at least one idler gear (29, 31).

2. The transmission device according to claim 1, wherein a countershaft (17), arranged in parallel to the second shaft (13) of the variator, is operatively connected to the transmission output (7).

3. The transmission device according to claim 1, wherein at least one idler gear (16) is operatively connected to a gear wheel (18) supported by the countershaft (17).

4. The transmission device according to claim 1, wherein the first and the second shift elements (14, 15) are arranged on at least one of the third shaft (11) of the planetary gear set (8) and the second shaft (13) of the variator (5).

5. The transmission device according to claim 1, wherein the second shaft (10) of the planetary gear set (8) is operatively connected, via a transmission unit, to the first shaft (12) of the variator (5).

6. The transmission device according to claim 1, wherein the variator (5) is a hydrostatic device which comprises at least one pump and at least one motor operatively connected thereto, via a hydraulic circuit, and both the at least one pump and the at least one motor are adjustable.

7. The transmission device according to claim 1, wherein the first shaft (9) of the planetary gear set (8) forms planet carrier, the second shaft (10) of the planetary gear set (8) forms a ring gear, and the third shaft (11) of the planetary gear set (8) forms a sun gear.

8. The transmission device according to claim 7, wherein the variator (5) is a hydrostatic device and a pump of the variator (5) is connected, via the first shaft (12) of the variator (5), to the ring gear (10) of the planetary gear set (8) and, in order to implement a rotational speed equal to zero in a region of the transmission output (7), a power flow of the variator (5) is locked and the second shaft (13) of the variator (5) is freely rotated without power transmission.

9. The transmission device according to claim 1, wherein a reverse direction of rotation, between the transmission input (6) and the transmission output (7), is implemented by a valve device of a hydraulic circuit of the variator (5) by which a pumping direction in the hydraulic circuit is reversed.

10. The transmission device according to claim 1, wherein a plurality of gear wheel pairs (20 to 20n) are located between the third shaft (11) of the planetary gear set (8) and the transmission output (7) which are connectable, via additional shift elements (21 to 21n), to implement additional gear ratio ranges.

11. The transmission device according to claim 10, wherein at least one of the gear wheel pairs comprises an intermediate gear (24) for implementing a reverse direction of rotation between the transmission input (6) and the transmission output (7).

12. The transmission device according to claim 1, wherein a third shift element (28) couples the second shaft (10) of the planetary gear set (8) to the transmission output (7) for implementing a third gear ratio range which overlaps with the second gear ratio range.

13. The transmission device according to claim 1, wherein the first shift and the second shift elements (14, 15, 21 to 21n, 22, 28) are each frictionally engaged power shift elements.

14. The transmission device according to claim 1, wherein the variator (5) is a hydrostatic device which comprises at least one pump and at least one motor operatively connected thereto, via a hydraulic circuit, and both the at least one pump and the at least one motor are bent axis devices.

15. The transmission device according to claim 1, wherein the second shaft (10) of the planetary gear set (8) is directly connected to the first shift element (14).

16. The transmission device according to claim 1, wherein the second shaft (10) of the planetary gear set (8) is directly connected to at least one idler gear (29, 31).

17. The transmission device according to claim 1, wherein at least one idler gear (29, 31) is both directly connected to at least one shift element (14, 28) and is directly coupled to the second shaft (10).

18. The transmission device according to claim 1, wherein at least two idler gears (29, 31) are both directly connected to respective shift elements (14, 28) and directly coupled to the second shaft (10).

19. A transmission device (3) having at least one variator (5) for the continuous variation of a gear ratio and having secondary power splitting;
- a planetary gear set (8) being provided for power splitting;
- a first shaft (9) of the planetary gear set (8) being coupled to a transmission input (6);
- a second shaft (10) of the planetary gear set (8) being coupled to a first shaft (12) of the variator (5);
- a third shaft (11) of the planetary gear set (8) being directly connected to a second shaft (13) of the variator (5);
- at least one of a first shift element (14) and a second shift element (15) being provided for switching between a first gear ratio range and a second gear ratio range, within which the gear ratio is continuously varied by the variator (5), and the first and the second gear ratio ranges at least partially overlap one another;
- the second shaft (10) of the planetary gear set (8) being connected, via the first shift element (14), to a transmission output (7) in order to implement the first gear ratio range;
- both the third shaft (11) of the planetary gear set (8) and the second shaft of the variator (5) being directly connected to the second shift element (15) and being connectable, during engagement of the second shift element (15), to the transmission output (7) for implementing the second gear ratio range; and
- at least one idler gear (16) being rigidly connectable, via one of the first and the second shift elements (14, 15), to one of the second shaft (13) of the variator (5) and the third shaft (11) of the planetary gear set (8).

20. A transmission device (3) having at least one variator (5) for the continuous variation of a gear ratio and having secondary power splitting;
- a planetary gear set (8) being provided for power splitting;
- a first shaft (9) of the planetary gear set (8) being coupled to a transmission input (6);
- a second shaft (10) of the planetary gear set (8) being coupled to a first shaft (12) of the variator (5);
- a third shaft (11) of the planetary gear set (8) directly connecting a sun gear of the planetary gear set (8) with to a second shaft (13) of the variator (5);
- at least one of a first shift element (14) and a second shift element (15) being provided for switching between a first gear ratio range and a second gear ratio range, within which the gear ratio is continuously varied by the variator (5), and the first and the second gear ratio ranges at least partially overlap one another;
- the second shaft (10) of the planetary gear set (8) being connected, via the first shift element (14), to a transmission output (7) in order to implement the first gear ratio range;
- both the third shaft (11) of the planetary gear set (8) and the second shaft of the variator (5) being directly connected to the second shift element (15) and being connectable, during engagement of the second shift element (15), to the transmission output (7) for implementing the second gear ratio range; and
- at least one idler gear (16) being rigidly connectable, via one of the first and the second shift elements (14, 15), to one of the second shaft (13) of the variator (5) and the third shaft (11) of the planetary gear set (8).

* * * * *